US006769661B2

(12) United States Patent
Wilson et al.

(10) Patent No.: US 6,769,661 B2
(45) Date of Patent: Aug. 3, 2004

(54) SYSTEM AND METHOD FOR MOUNTING HEAVY MACHINERY TO A HORIZONTAL SUPPORT

(76) Inventors: Daniel P. Wilson, 21 Arizona Ave. #101, Long Beach, NY (US) 11561; Louis H. Gonzalez, 5 Lagoda St., Parlin, NJ (US) 08859

( * ) Notice: Subject to any disclaimer, the term of this patent is extended or adjusted under 35 U.S.C. 154(b) by 0 days.

(21) Appl. No.: 10/047,582

(22) Filed: Jan. 14, 2002

(65) Prior Publication Data

US 2002/0109067 A1 Aug. 15, 2002

Related U.S. Application Data

(60) Provisional application No. 60/261,390, filed on Jan. 12, 2001.

(51) Int. Cl.[7] .................................................. F16M 1/00
(52) U.S. Cl. ........................................ 248/676; 248/679
(58) Field of Search ................................ 248/676, 637, 248/670, 672, 678, 680, 679, 651, 346.01, 346.03, 911, 912, 188.1

(56) References Cited

U.S. PATENT DOCUMENTS

| | | | | |
|---|---|---|---|---|
| 1,666,149 A | * | 4/1928 | Rosenzweig | 248/679 |
| 1,974,158 A | * | 9/1934 | Okenfuss | 248/651 |
| 2,210,051 A | * | 8/1940 | Woodbury | 248/562 |
| 2,378,106 A | * | 6/1945 | Rosenzweig et al. | 248/635 |
| 2,696,139 A | * | 12/1954 | Attwood | 411/427 |
| 3,483,910 A | * | 12/1969 | LaLonde et al. | 411/112 |
| 4,120,210 A | * | 10/1978 | Sloyan | 248/657 |
| 4,146,074 A | * | 3/1979 | Kowalski | 411/111 |
| 4,354,655 A | * | 10/1982 | Hengst | 248/679 |
| 4,575,295 A | * | 3/1986 | Rebentisch | 411/85 |
| 4,830,531 A | * | 5/1989 | Condit et al. | 403/348 |
| 5,118,233 A | * | 6/1992 | Mitchell | 411/5 |
| 5,271,586 A | * | 12/1993 | Schmidt | 248/58 |
| 5,277,395 A | * | 1/1994 | Smith et al. | 248/679 |

* cited by examiner

Primary Examiner—Anita M. King
(74) Attorney, Agent, or Firm—Dilworth & Barrese, LLP

(57) ABSTRACT

A novel system and method for installation of heavy machinery includes an adjustable frame and bracketing system and mounting bolts translatable along fixed or movable brackets provides. The system provides the flexibility needed to facilitate proper alignment of the bolts with respect to mounting apertures of a heavy machine to thereby effect installation of the machine without any modification to the existing machine structure.

3 Claims, 6 Drawing Sheets

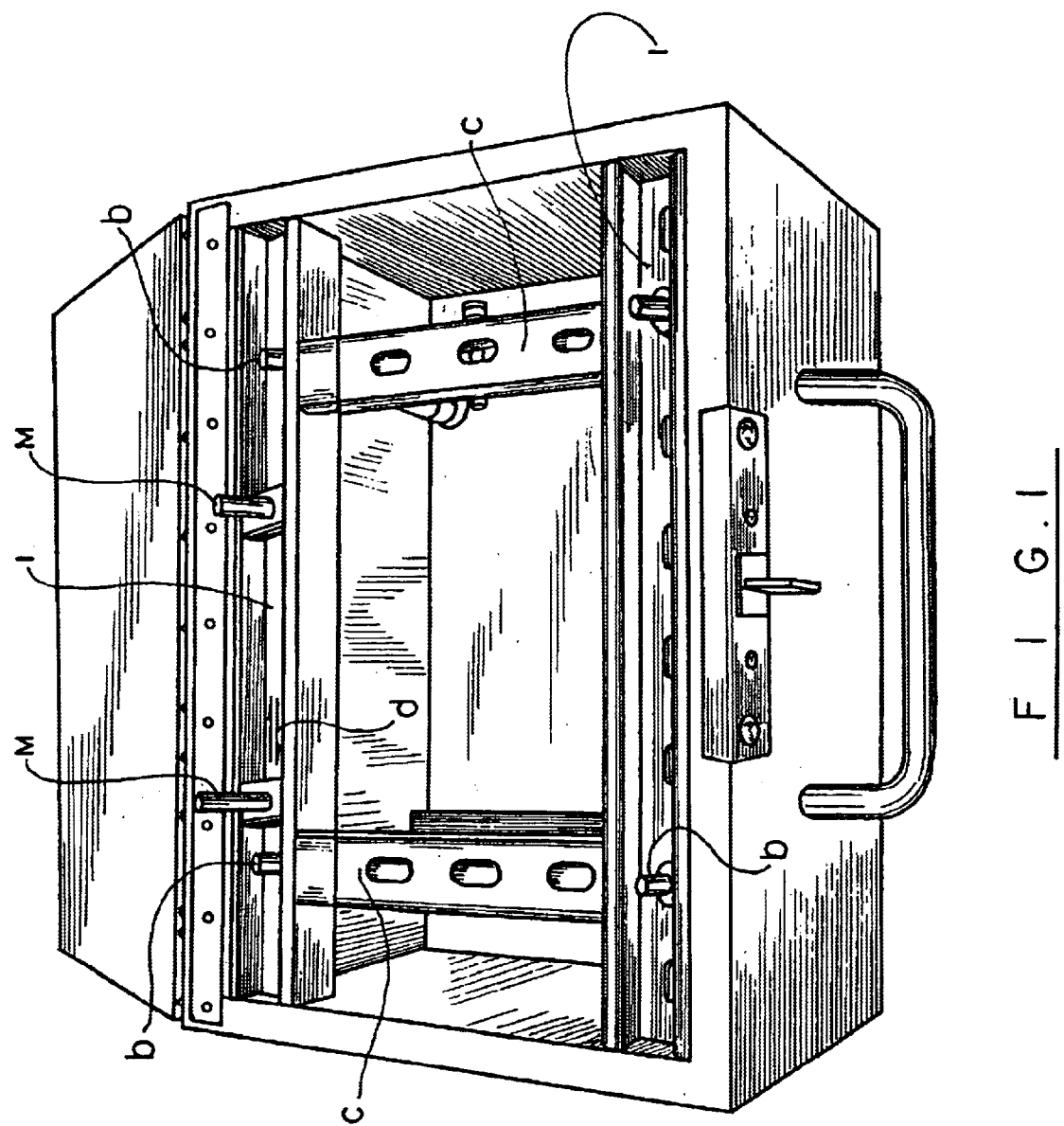
F I G. 1

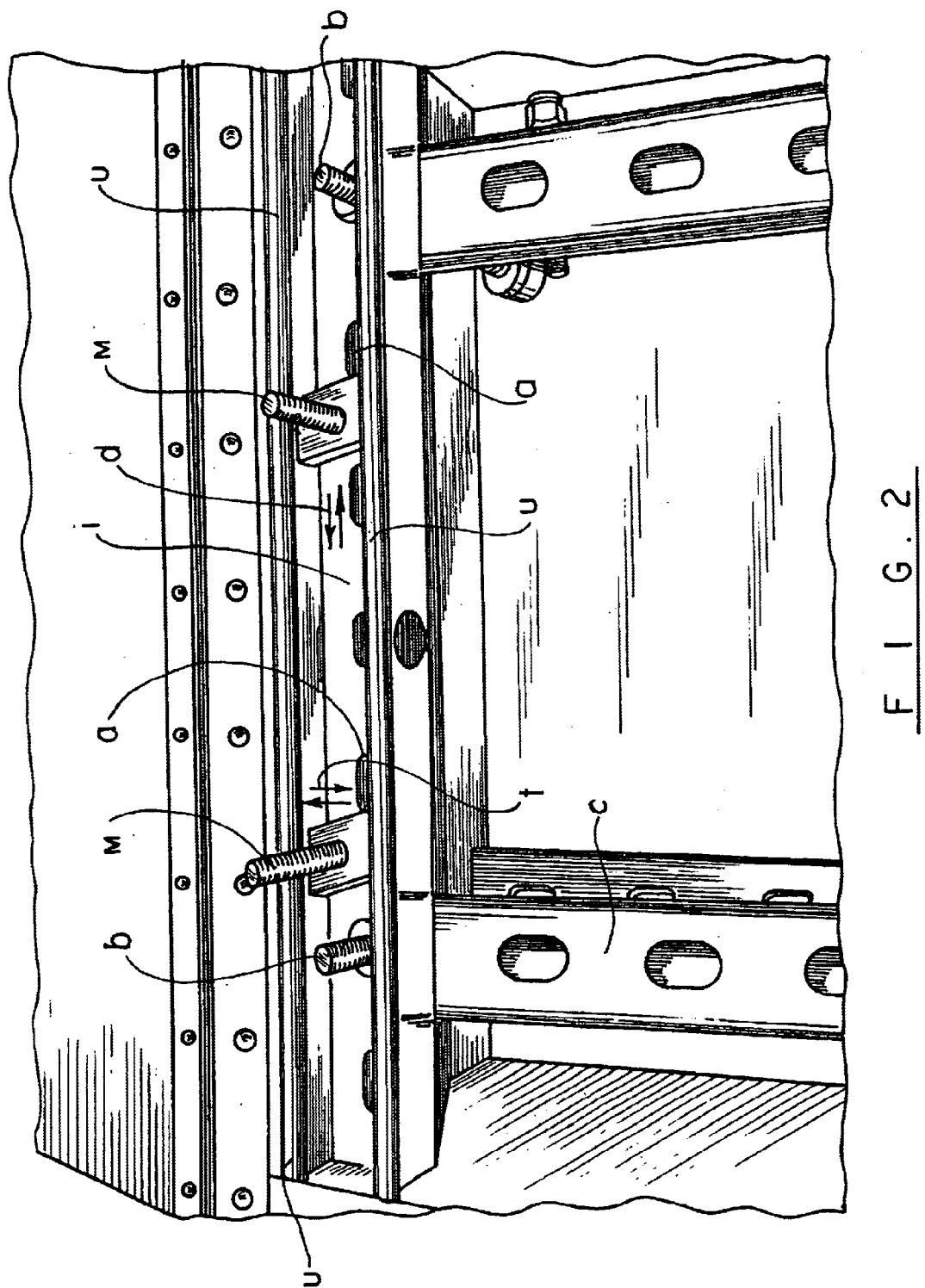
F I G. 2

SYSTEM AND METHOD FOR MOUNTING HEAVY MACHINERY TO A HORIZONTAL SUPPORT

CROSS-REFERENCE TO RELATED APPLICATION

This application claims priority to provisional application Ser. No. 60/261,390, filed Jan. 12, 2001, the contents of which are incorporated herein by reference.

BACKGROUND OF THE INVENTION

1. Field of the Invention

The present invention is directed to a system and method for mounting heavy machinery to a horizontal support and, more particularly, to a system and method for mounting a commercial or industrial washing machine to a cement base.

2. Background of the Invention

Current methods for installing heavy machinery such as commercial washing machines include bolting the machines to an existing concrete floor or a newly poured concrete foundation. The bolts are anchored in upright position to the floor and arranged to preferably extend in alignment with bolt receiving apertures of the machine. The washing machine is lifted and lowered in position onto the bolts and subsequently secured with self locking nuts. In one known method employed by Wascomat of Inwood, N.Y., a template depicting the size of the foundation to be poured and desired location of the foundation bolts is provided.

However existing methodalities for installing heavy machinery such as the template system utilized by Wascomat are subject to certain deficiencies which detract from their usefulness. Most notable of these deficiencies is the ineffectiveness in properly aligning the bolts for reception within the bolt receiving or mounting apertures of the machine. In particular, the bolts are often installed at the incorrect locations due to operator error, or may extend in non-orthogonal relation to the cement base due to, e.g., uneven settling of the concrete. In addition, manufacturing tolerances with respect to the location of the mounting apertures of the machine may also compound the installation process.

As appreciated, any deviation from the precise positioning of the mounting bolts with respect to the mounting apertures of the machine creates significant obstacles to the operator/installer during installation. More specifically, the operator/installer may typically undertake significant modifications to the base of the machine to enlarge or create new bolt receiving apertures. Such modification obviously entails a substantial amount of man power. But, more importantly, any substantial modifications made to the machines degrades its overall appearance.

SUMMARY OF THE INVENTION

Accordingly, the present invention is directed to a novel system and method for installation of heavy machinery. In accordance with the subject invention, a novel adjustable frame and bracketing system incorporating mounting bolts translatable along fixed or movable brackets provides the flexibility needed to facilitate proper alignment of the bolts with respect to mounting apertures of the heavy machine to thereby effect installation of the machine without any modification to the existing machine structure.

BRIEF DESCRIPTION OF THE DRAWINGS

Preferred embodiments of the present disclosure are described herein with reference to the drawings wherein:

FIG. 1 is a photograph illustrating a scaled down version of the system for installation of a heavy machine in accordance with the principles of the present invention;

FIGS. 2–4 are photographs illustrating the components of the system of FIG. 1;

DESCRIPTION OF THE PREFERRED EMBODIMENTS

Figure 3:
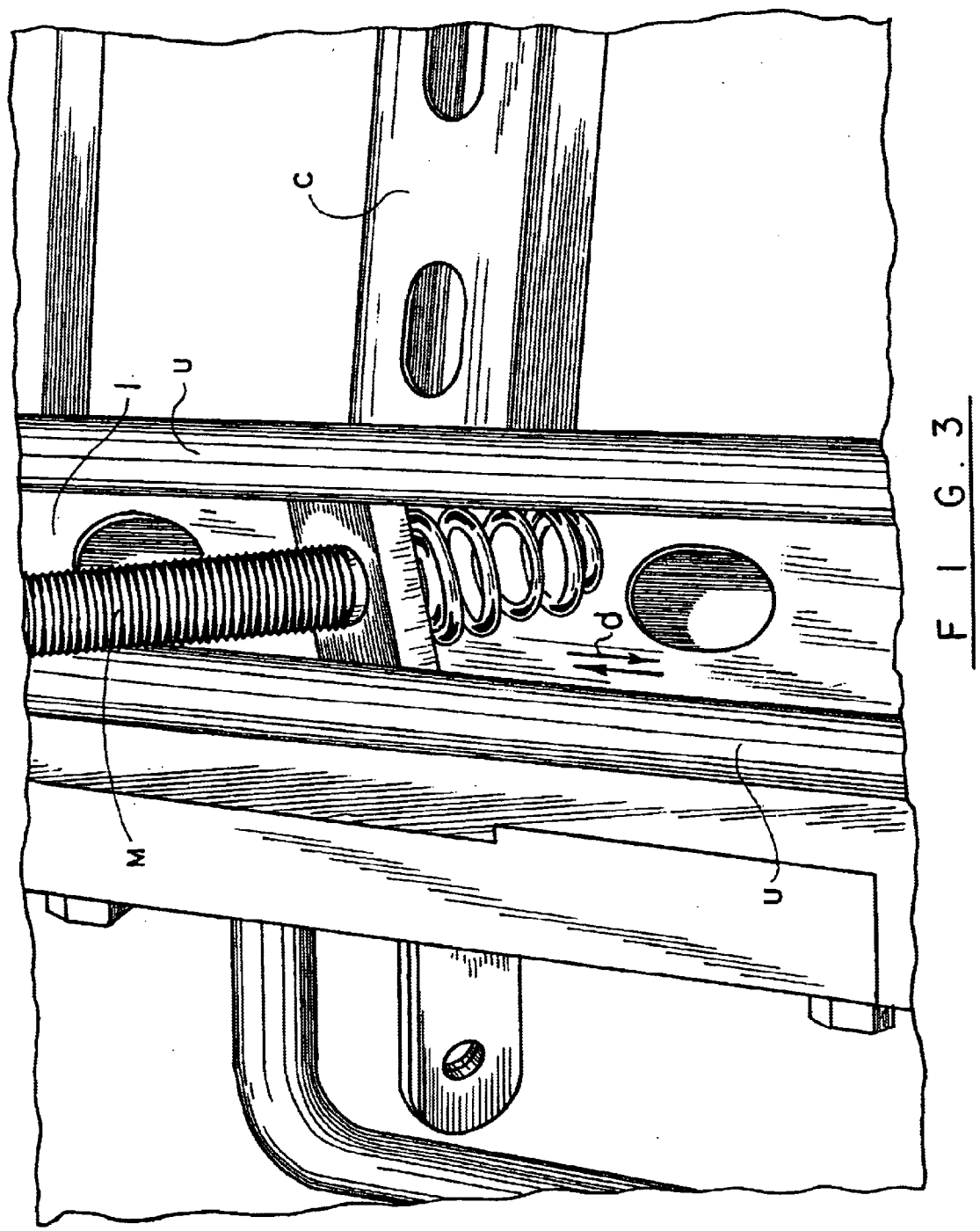

With reference to the photographs submitted with this application, the novel adjustable frame and bracketing system of the present disclosure includes an adjustable frame and a plurality of mounting bolts adapted for selective movement within and relative to the frame. Referring in particular to FIG. 1, the frame includes first and second longitudinal rails 10 extending in general parallel relation to each other and at least one connecting or cross rail 12 (two are shown and preferred) interconnecting the two longitudinal rails 10. The two longitudinal rails 10 are disposed beneath the front and rear of the machine when the machine is installed. As best depicted in FIGS. 2–3, in conjunction with FIG. 1, the two longitudinal rails 10 are preferably commercially available channel rails. Such channel rails are characterized by having three orthogonal sides with the lower side having a plurality of longitudinally spaced apertures 14 for receiving, e.g., fasteners, bolts, etc. The remaining sides define upper lips 16 which function to retain an element, e.g., mounting bolts, within the channel while permitting translation of the element therewithin.

The cross rails 12 may be any commercial perforated bracket, or alternatively, the aforedescribed channel rail which is inverted when positioned against the longitudinal rails. The cross rails may be connected to the longitudinal rails 10 with the use of conventional bolts and locking nuts 18 extending through corresponding apertures of the connecting and parallel rails. The cross rails 12 preferably secure the longitudinal rails 10 at a predetermined distance corresponding to the distance between the forward and rear bolt receiving apertures of the machines. It is appreciated that the apertures within the cross rails 12 permit selected adjustment of the cross rails 12 with respect to the longitudinal rails thereby enabling the user to adjust the distance between the longitudinal rails to accommodate different specifications of the various machines.

Figure 4:
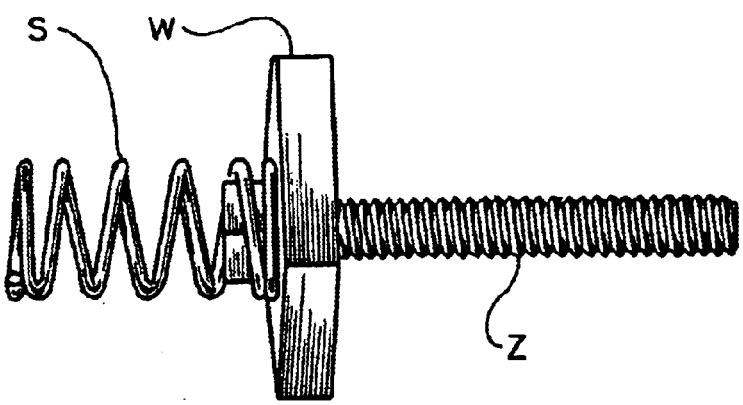
Figure 4:
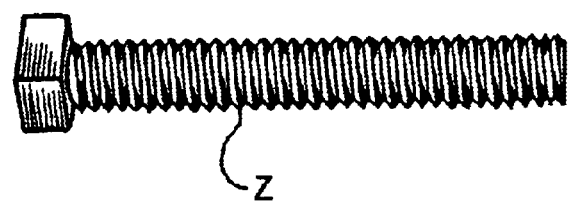
Figure 4:
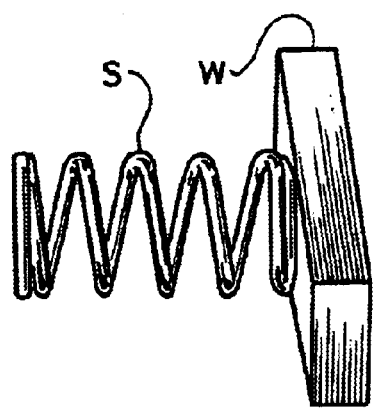

Referring still to the photographs, the system further includes a plurality of machine mounting elements 20 which function to mount the system to the heavy machine. The mounting elements 20 are received within the channels defined by the longitudinal rails 10 and are adapted to longitudinally move within the channels (as indicated by the directional arrows "d") for selective positioning with respect to the mounting apertures of the machine. One preferred mounting element 20 contemplated by the present invention is the bolt apparatus detailed in FIG. 4. The preferred bolt apparatus includes a bolt 22, an enlarged washer 24 threadably engaged to the bolt and a coil spring 26 which is connected to the washer. As appreciated, the components of the bolt apparatus may be assembled prior to mounting to the respective channel. The bolt apparatus is inverted and positioned within the channel of the longitudinal rail with the washer 24 confined within the lips 16 of the U-shaped rail.

In this relation, the bolt 22 may traverse within the channel for positioning with respect to the machine mounting apertures. Preferably, the enlarged washer 24 is in the form of a parallelepiped, although other shapes and dimensions are envisioned as well. In the preferred embodiment, there exists a clearance between the outer edge of the washer and the internal surface of the longitudinal rail to also permit lateral movement indicated by the directional arrows "t" (FIG. 2) of the bolt 22 within the rail. This lateral movement permits lateral adjustment of the bolt within the longitudinal rail 10 to further facilitate insertion within the mounting apertures of the washing machine. The coil spring 26 of the bolt apparatus engages the interior surface of the lower rail and accordingly normally biases the bolt 22 upwardly to be received within the mounting apertures of the machinery. The coil spring 26 also permits the bolts 22 to pivot about the coil spring 26 to further facilitate alignment and reception within the apertures of the heavy machine as will be discussed.

Figure 5:
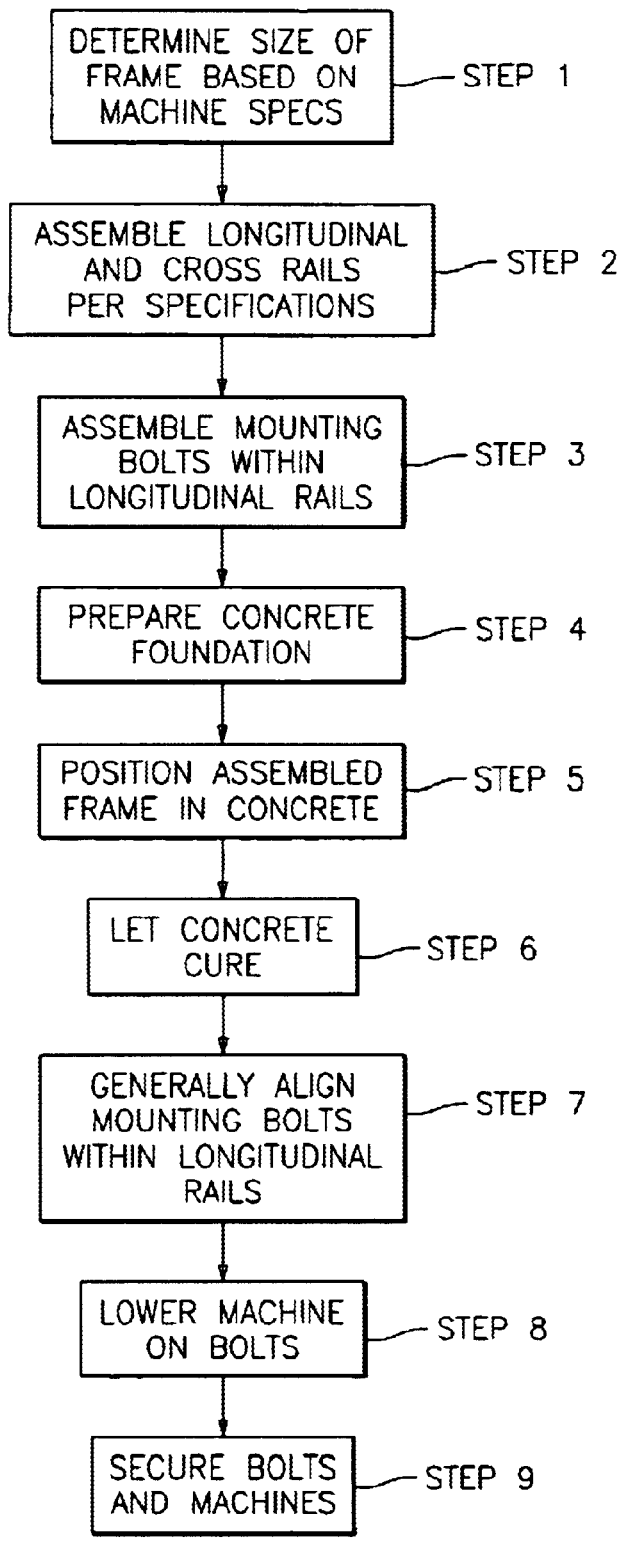
FIG. 5 is a flow chart illustrating the preferred sequence of installation of a heavy machine utilizing the system of the present invention.
Figure 6:
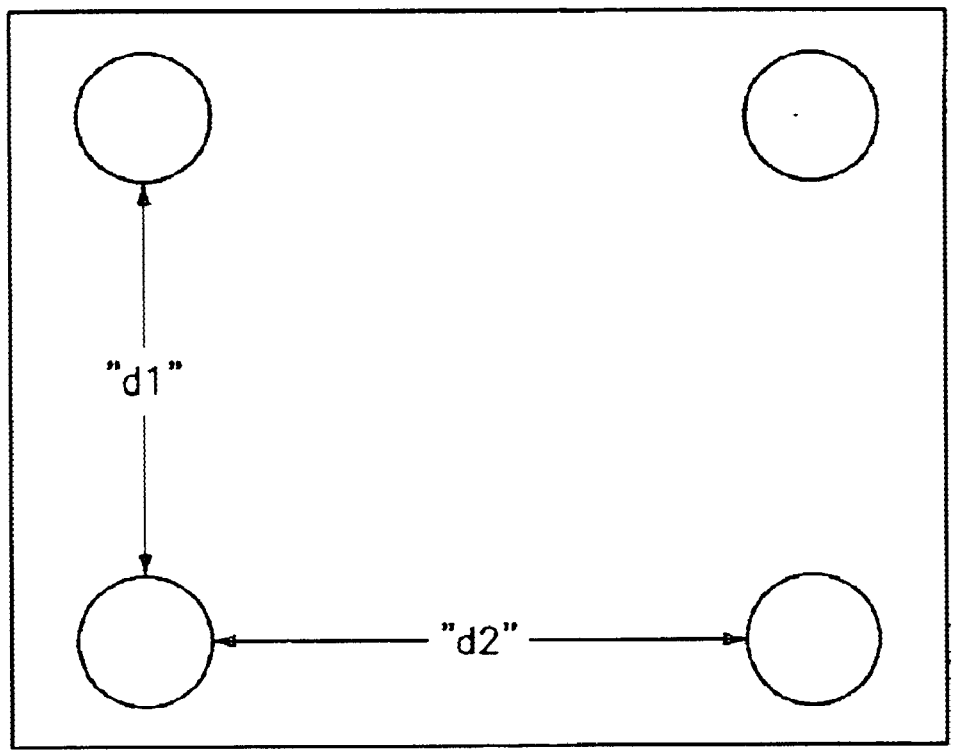
FIG. 6 is a schematic illustrating the lower surface of a commercial washing machine and the locations of the mounting apertures.

The use of the system for installing a commercial washing machine will now be discussed. With reference to the flow chart depicted in FIG. 5, the size of the frame needed to install the washing machine must be initially determined (STEP 1). As appreciated, commercial washing machines are of various sizes and the location of the mounting apertures vary in accordance with the machine size. Generally, however, the mounting apertures are located adjacent each of the four corners beneath the bottom of the machine. Installation instructions accompanying the machines provide the specific dimensions. FIG. 6 is a schematic drawing representative of the bottom plate or surface of a washing machine. Distance "d1" represents the "lateral" distance between the front and rear mounting apertures of the machine while distance "d2" represents the "longitudinal" distance between adjacent apertures in each of the respective front and rear ends of the machine.

Referring again to FIG. 5, once the dimensions have been determined, the frame is assembled to connect the longitudinal rails 10 and cross rails 12 to each other (STEP 2). In the preferred application, the lateral distance between the longitudinal rails 10 is critical to ensure proper installation, thus, care is taken to ensure that the distance between the longitudinal rails 10 generally corresponds to the lateral distance "d1" between the front and rear mounting holes of the machines. The longitudinal rails 10 and cross rails 12 are secured to each other with conventional bolts and nuts and the four spring bolt apparatii are positioned within the respective channels of the rails in the manner best depicted in FIG. 3 (STEP 3). In the mounted position, the spring 26 is compressed and engages the lower surface of the longitudinal rail 10 to normally bias the bolt 18 in the upright position orthogonal to the lower surface of the rail 10. The mounting washer 24 is arranged to be retained within the upper lips 16 of the rails 10. Thereafter, the concrete foundation is prepared and the system is placed in the concrete (STEPS 4 and 5). Preferably, the top surface of the longitudinal rails is even with the top surface of the concrete upon placement therein. Obviously, care is taken to ensure that concret does not enter the longitudinal rails 10. The concrete is left to cure (STEP 6). It is appreciated that the mounting spring bolts can be installed within the longitudinal rails 10 subsequent to preparation of the concrete as well. Upon curing, the spring bolts 22 are moved within their respective rails 10 to generally correspond to the locations of the mounting apertures of the heavy machines (STEP 7). Thereafter, the machine is lowered into position on the frame (STEP 8). As the machine is lowered, the bolts 22 of the spring bolt are passed through the mounting apertures of the machines. It is appreciated that the spring bolts 22 may move laterally within the longitudinal rails 10 or may pivot to any oblique position to accommodate misalignment of the mounting bolts due to inconsistencies in the frame, cement settlement, etc., thereby facilitating the reception of the mounting bolts within the mounting apertures of the machine. In an alternate method, the spring bolts 22 may be installed within the longitudinal rails 10 after the machine is lowered onto the frame through, e.g., access openings adjacent the sides of the machine or through access openings associated with the rails "1". In addition, the bolt apparatus may be assembled subsequent to placement of the machine as well. With the mounting bolts disposed within the mounting apertures of the machines, the machine is then secured in position by placing appropriate washers and self-locking nuts on the bolts (STEP 9).

Thus, by virtue of the novel features of the present invention, installation of heavy machines to a cement base is facilitated without undue modification of the mounting apertures of the machines. It is noted that the frame and bracket system also functions to reinforce the concrete to minimize cracking, etc., when subjected to torsimal forces of the machine and temperature changes.

It is envisioned that the novel frame and bracket system may be sold as an after market item, i.e, preassembled to predetermined specifications, and provided upon purchase of a washing machine.

While the above description contains many specifics, these specifics should not be construed as limitations on the scope of the disclosure, but merely as exemplifications of preferred embodiments thereof. Those skilled in the art will envision many other possible variations that are within the scope and spirit of the invention

What is claimed is:

1. A system for mounting a heavy machine to a support, the heavy machine defining a lower surface with front and rear mounting apertures extending therethrough, the system comprising:

a frame including first and second longitudinal members each provided with a U-shaped channel;

at least one cross member for operatively connecting the longitudinal members at a predetermined spaced relation generally corresponding to a distance between the front and rear mounting apertures of the heavy machine; and at least one fastening element mounted to a respective U-shaped channel of each longitudinal member and configured to move therein along a plurality of paths extending transversely to one another in longitudinal and lateral directions for reception within a respective one of the front and rear mounting apertures of the heavy machine to secure the heavy machine to the frame.

2. The system according to claim 1, wherein the at least one fastening element is adapted for pivotal movement relative to a respective one of the first and second longitudinal members to facilitate alignment with the respective mounting aperture.

3. The system according to claim 1, wherein the at least one fastening element includes a fastening bolt, a washer and a coil spring mounted to the bolt, the washer having a width smaller than a width of the U-shaped channel of the first and second longitudinal members to allow the coil spring to move on a bottom of the respective U-shaped channel to a position wherein the fastening bolt is received within the respective mounting aperture of the machine.

\* \* \* \* \*